(12) United States Patent
Nishimura

(10) Patent No.: US 10,358,012 B2
(45) Date of Patent: Jul. 23, 2019

(54) STABILIZER AND METHOD FOR MANUFACTURING SAME

(71) Applicant: NHK Spring Co., Ltd., Kanagawa (JP)

(72) Inventor: Tatsuya Nishimura, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 15/560,031

(22) PCT Filed: Jan. 27, 2016

(86) PCT No.: PCT/JP2016/052336
§ 371 (c)(1),
(2) Date: Sep. 20, 2017

(87) PCT Pub. No.: WO2016/152240
PCT Pub. Date: Sep. 29, 2016

(65) Prior Publication Data
US 2018/0072127 A1 Mar. 15, 2018

(30) Foreign Application Priority Data
Mar. 23, 2015 (JP) .................. 2015-058960

(51) Int. Cl.
*B60G 21/02* (2006.01)
*B60G 21/055* (2006.01)
(Continued)

(52) U.S. Cl.
CPC ....... *B60G 21/0551* (2013.01); *B60G 21/055* (2013.01); *C21D 1/10* (2013.01);
(Continued)

(58) Field of Classification Search
CPC ............................. B60G 21/055; B60G 11/18
(Continued)

(56) References Cited

U.S. PATENT DOCUMENTS

| | | | | |
|---|---|---|---|---|
| 4,138,141 A | * | 2/1979 | Andersen ............ | B60G 21/055 267/273 |
| 4,365,824 A | * | 12/1982 | Ohno ................... | B60G 21/055 267/273 |

(Continued)

FOREIGN PATENT DOCUMENTS

| | | |
|---|---|---|
| CN | 101378921 A | 3/2009 |
| CN | 102189910 A | 9/2011 |

(Continued)

OTHER PUBLICATIONS

International Search Report for Application No. PCT/JP2016/052336, dated Apr. 12, 2016.

(Continued)

*Primary Examiner* — Christopher P Schwartz
(74) *Attorney, Agent, or Firm* — Marshall, Gerstein & Borun LLP

(57) ABSTRACT

A stabilizer including: a main body for generating an elastic restoring force; and connecting portions formed on both ends of the main body and respectively connected to left and right suspension devices. Hardness of the connecting portions is lower than that of the main body. A method for manufacturing the stabilizer includes, in order, an entire body heat treatment process for heat treating an entire stabilizer and increasing hardness of the entire stabilizer, and a connecting portion softening process for heating the connecting portions and reducing the hardness of the connecting portions. The method for manufacturing the stabilizer thereby increases hardness of the main body and reduces the hardness of the connecting portions lower than that of the main body.

2 Claims, 5 Drawing Sheets

(51) Int. Cl.
| | | |
|---|---|---|
| *F16F 1/14* | (2006.01) | |
| *C21D 1/18* | (2006.01) | |
| *C21D 1/40* | (2006.01) | |
| *F16F 1/16* | (2006.01) | |
| *C21D 1/10* | (2006.01) | |
| *C21D 1/42* | (2006.01) | |

(52) U.S. Cl.
CPC ................ *C21D 1/18* (2013.01); *C21D 1/40* (2013.01); *C21D 1/42* (2013.01); *F16F 1/14* (2013.01); *F16F 1/16* (2013.01); *B60G 2202/135* (2013.01); *B60G 2204/1484* (2013.01); *B60G 2206/427* (2013.01); *B60G 2206/724* (2013.01); *B60G 2206/84* (2013.01); *C21D 2221/00* (2013.01); *F16F 2230/0023* (2013.01); *Y02P 10/253* (2015.11)

(58) Field of Classification Search
USPC ............... 267/188, 189, 273; 280/124.106, 280/124.107, 124.152
See application file for complete search history.

(56) References Cited

U.S. PATENT DOCUMENTS

| | | | | |
|---|---|---|---|---|
| 4,378,122 | A * | 3/1983 | Ohno ................ | B60G 21/055 138/109 |
| 4,429,899 | A * | 2/1984 | Ohno ................ | B60G 21/055 138/109 |
| 4,781,054 | A | 11/1988 | Brown et al. | |
| 5,454,888 | A * | 10/1995 | Gallagher, Jr. .... | B60G 21/0551 148/648 |
| 6,318,710 | B1 * | 11/2001 | Anderson ............ | B60G 21/055 267/154 |
| 6,682,610 | B1 * | 1/2004 | Inoue .................... | B21C 37/06 148/519 |
| 7,744,708 | B2 * | 6/2010 | Lopez ................ | B60G 21/055 148/574 |
| 7,984,918 | B2 * | 7/2011 | Jung .................... | B60G 21/055 280/124.106 |
| 2011/0115182 | A1 * | 5/2011 | Kuroda .............. | B60G 21/0551 280/124.106 |
| 2011/0254243 | A1 | 10/2011 | Aalderink et al. | |
| 2012/0318409 | A1 * | 12/2012 | Mizuno ................ | B60G 21/055 148/506 |
| 2013/0032257 | A1 * | 2/2013 | Boettcher ............ | B21D 22/022 148/714 |
| 2014/0060709 | A1 * | 3/2014 | Tange .................... | C21D 6/005 148/568 |
| 2017/0066299 | A1 * | 3/2017 | Mucher .............. | B60G 21/0551 |

FOREIGN PATENT DOCUMENTS

| | | |
|---|---|---|
| CN | 102717679 A | 10/2012 |
| EP | 1125774 A2 | 8/2001 |
| EP | 3138708 A1 | 3/2017 |
| JP | 56-39910 A | 4/1981 |
| JP | 56-79009 A | 6/1981 |
| JP | S6164812 A | 4/1986 |
| JP | 2010-023642 A | 2/2010 |
| JP | 2012-237040 A | 12/2012 |
| KR | 20140048429 A | 4/2014 |

OTHER PUBLICATIONS

European Search Report for European Patent Application No. 16768143.6, dated Oct. 19, 2018.
Chinese First Office Action for Application No. 201680015619.7, dated Jan. 31, 2019.
European Search Report for Application No. 16768143.6, dated Feb. 7, 2019.

* cited by examiner

STABILIZER AND METHOD FOR MANUFACTURING SAME

CROSS-REFERENCE TO RELATED APPLICATION

The present application is the US national phase of International Application No. PCT/JP2016/052336, filed Jan. 27, 2016, which claims priority to Japanese Application No. 2015-058960, filed Mar. 23, 2015. The priority application, JP 2015-058960, is hereby incorporated by reference.

TECHNICAL FIELD

The present invention relates to a stabilizer and a method for manufacturing the same.

BACKGROUND ART

As a conventional example of a stabilizer bar (hereinafter referred to as a stabilizer), a stabilizer described in Patent Document 1 is known. Patent Document 1 discloses the stabilizer including a torsion portion attached to a vehicle body via a bush and a bracket, arm portions formed on both ends of the torsion portion, and a flat plate-like connecting portion formed on an end of the arm portion and connected to a suspension device. For example, when a vehicle turns, the stabilizer bends and twists due to a difference in displacement amount between right and left suspension devices, so that roll of the vehicle is suppressed by an elastic restoring force of the stabilizer.

SUMMARY OF INVENTION

Technical Problem

For example, in order to improve ride comfort of the vehicle, when rigidity (spring constant) of a coil spring or the like for supporting the vehicle body is reduced, roll rigidity of the vehicle is reduced, and thus it is necessary to increase rigidity of the stabilizer. When the rigidity of the stabilizer is increased, there is a problem that stress generated in the stabilizer is increased, and as a means for improving durability, that is, fatigue life against this high stress, increasing hardness of the stabilizer is known.

Since increasing the hardness decreases toughness, there are the following problems. When the stabilizer is exposed to a corrosive environment such as rainwater after attachment to the vehicle, and dimensional accuracy such as flatness, parallelism or the like is lowered due to manufacturing error or the like in a connecting portion, and when the connecting portion is fastened by a bolt, for example, with a flat surface of the connecting portion being twisted, the connecting portion of the stabilizer is in a deformed state and brought into close contact with a connecting portion of the suspension device. That is, stress is always applied to the connecting portion of the stabilizer. As a result, there is a possibility that a breakdown phenomenon, so-called delayed fracture caused by the stress always applied to the connecting portion of the stabilizer under a corrosive environment occurs.

The present invention has been made to solve these problems, and an object of the present invention is to provide a stabilizer capable of improving fatigue life of the stabilizer while suppressing delayed fracture of a connecting portion thereof and a method for manufacturing the stabilizer.

Solution to Problem

In order to solve the above problems, the present invention is a stabilizer including a main body for generating an elastic restoring force, and connecting portions formed on both ends of the main body and respectively connected to left and right suspension devices, wherein hardness of the connecting portion is lower than that of the main body.

According to the present invention, by increasing hardness of the main body, it is possible to secure durability to withstand high stress, thereby improving fatigue life of the main body, and by reducing the hardness of the connecting portion, it is possible to prevent reduction of toughness, thereby suppressing delayed fracture of the connecting portion.

Further, the present invention is a method for manufacturing a stabilizer including a main body for generating an elastic restoring force, and connecting portions formed on both ends of the main body and respectively connected to left and right suspension devices, wherein by a connecting portion softening process of reducing hardness of the connecting portion by heating the connecting portion, the stabilizer including the connecting portion with lower hardness than that of the main body is manufactured.

According to the present invention, it is possible to reduce the hardness of the connecting portion lower than that of the main body by a simple process. When a material originally having a high hardness is used, treatment for increasing the hardness of the main body is not necessary.

Further, the present invention is the method for manufacturing the stabilizer, wherein before the connecting portion softening process, an entire body heat treatment process is performed by heating an entire stabilizer to increase hardness of the entire stabilizer.

According to the present invention, when a material originally having a relatively low hardness is used, it is possible to reduce the hardness of the connecting portion lower than that of the main body by simple processes of the entire body heat treatment process and the connecting portion softening process.

Further, the present invention is the method for manufacturing the stabilizer, wherein the connecting portion softening process is configured to high-frequency heat or electrically heat the connecting portion.

Since a heating equipment of high-frequency heating type or electric heating type is simple in structure and excellent in general versatility, equipment cost can be suppressed.

Further, the present invention is a method for manufacturing a stabilizer including a main body for generating an elastic restoring force, and connecting portions formed on both ends of the main body and respectively connected to left and right suspension devices, wherein by a main body hardening process of increasing hardness of the main body by including a main body heat treatment process of heat treating only the main body, the stabilizer including the connecting portion with lower hardness than that of the main body is manufactured.

According to the present invention, it is possible to reduce the hardness of the connecting portion lower than that of the main body by a simple process.

Further, the present invention is the method for manufacturing the stabilizer, wherein the main body hardening process is configured to perform in order the following processes, an entire body heating process of heating an entire stabilizer, the main body heat treatment process, and a connecting portion slow cooling process of slowly cooling the connecting portion heated by heat conduction in the main body heat treatment process. Furthermore, the present invention is the method for manufacturing the stabilizer, wherein the main body hardening process is configured to perform in order the following processes, a main body heating process of heating only the main body, and the main body heat treatment process.

According to these inventions, it is possible to reduce the hardness of the connecting portion lower than that of the main body by simpler processes.

Further, the present invention is the method for manufacturing the stabilizer, wherein the main body heating process is configured to high-frequency heat or electrically heat the main body.

Since the heating equipment of high-frequency heating type or electric heating type is simple in structure and excellent in general versatility, equipment cost can be suppressed.

Advantageous Effects of Invention

According to the present invention, it is possible to improve fatigue life of the stabilizer while suppressing delayed fracture of the connecting portion.

DESCRIPTION OF EMBODIMENTS

Figure 1:
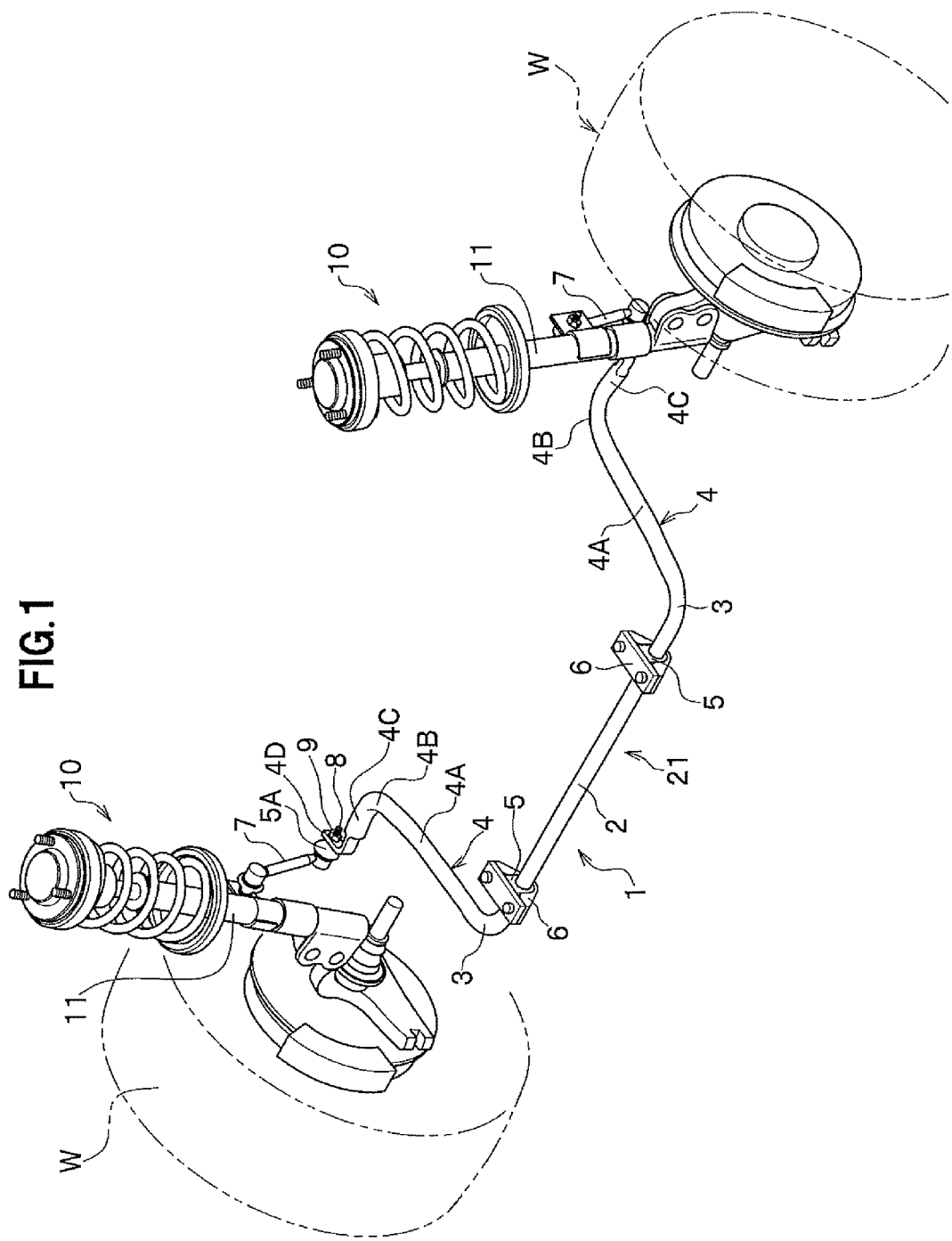
FIG. 1 is an external perspective view of a stabilizer.

As shown in FIG. 1, a stabilizer bar (hereinafter referred to as a stabilizer) 1 connects shock absorbers 11 of two suspension devices 10 for respectively supporting left and right wheels W. For example, when a vehicle turns, the stabilizer 1 bends and twists due to a difference in displacement amount between right and left shock absorbers 11, so that roll of the vehicle is suppressed by an elastic restoring force of the stabilizer 1.

The stabilizer 1 of the present embodiment is a solid round bar-like member and includes a torsion portion 2 extending in a vehicle width (left and right) direction, a pair of left and right shoulder bent portions 3 bent substantially at right angles from both ends of the torsion portion 2, and a pair of left and right arms 4 extending substantially in a front-rear direction respectively from the shoulder bent portions 3.

Figure 2:
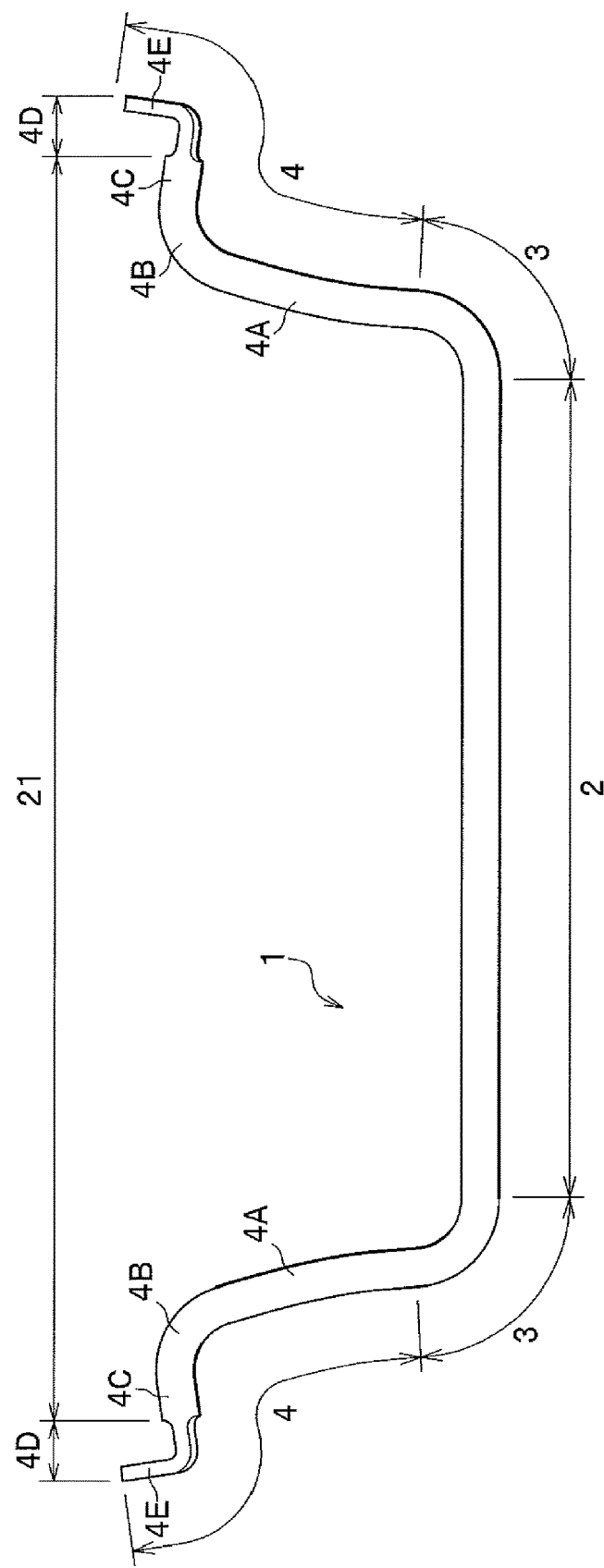
FIG. 2 is a plan view of the stabilizer.

The torsion portion 2 is mounted on a vehicle body via a pair of rubber bushes 5 and clamps 6 attached near both ends thereof. As also shown in FIG. 2, the arm 4 of the present embodiment includes a first arm 4A extending substantially in the front-rear direction from the shoulder bent portion 3, in particular, substantially in the front-rear direction so as to be displaced outwardly in a vehicle width direction toward a rear, a second arm 4C extending substantially outwardly in the vehicle width direction via a bent portion 4B from a rear end of the first arm 4A, and a connecting portion 4D formed on an end of the second arm 4C. In the present invention, shape of the arm 4 is not limited thereto, and for example, the connecting portion 4D may be formed on the rear end of the first arm 4A without having the bent portion 4B and the second arm 4C.

Figure 3:
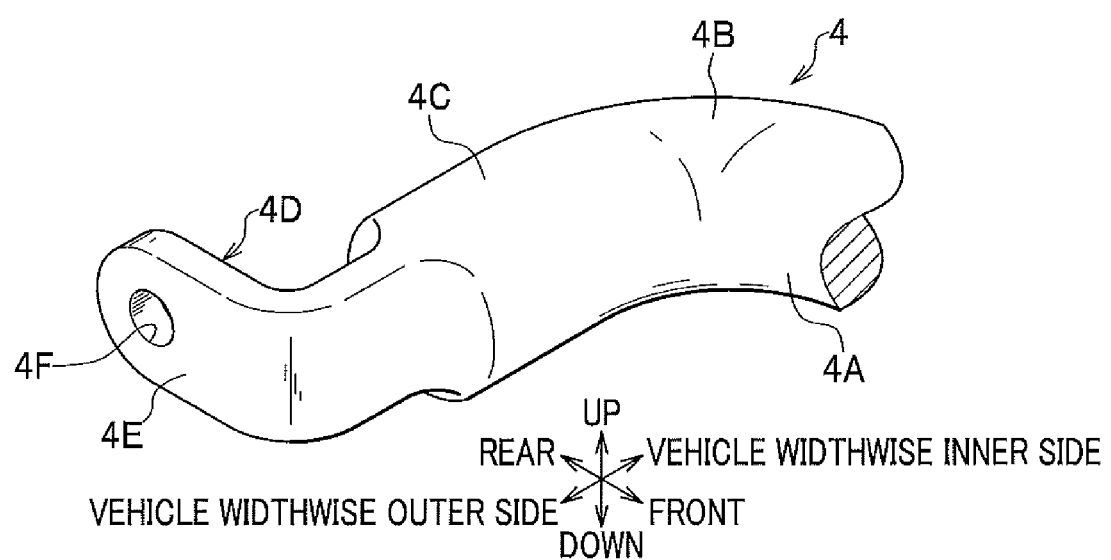
FIG. 3 is an external perspective view around a connecting portion.

A portion of the stabilizer 1 excluding the connecting portion 4D has a circular cross-sectional shape. In FIG. 1, the connecting portion 4D has a plate shape so as to be applied to a connecting portion 5A of a link arm 7 interposed between the shock absorber 11 and the connecting portion 4D. As shown in FIG. 3, the connecting portion 4D has a flat plate-like connecting seat 4E extending once outward in the vehicle width direction from the end of the second arm 4C, and then bent substantially at a right angle to extend substantially rearwardly. The connecting seat 4E is formed as a surface in a substantially vertical direction and a bolt through-hole 4F passing through a plate surface is perforated therethrough.

The connecting portion 4D is a portion to be formed by forging. In particular, a surface on an outer side in the vehicle width direction of the connecting seat 4E is formed with high flatness so as to be in close contact with a surface of the connecting portion 5A of the link arm 7. The stabilizer 1 is connected to the shock absorber 11 by the surface on the outer side in the vehicle width direction of the connecting seat 4E being applied to the connecting portion 5A of the link arm 7 so that they are fastened and fixed by a bolt 8 and a nut 9.

In the present specification, a portion of the stabilizer 1 excluding the connecting portion 4D, that is, the torsion portion 2, the shoulder bent portion 3 and the arm 4 (first arm 4A, bent portion 4B, second arm 4C) of the stabilizer 1 is referred to as a main body 21 as a portion serving a function of generating an elastic restoring force, and is distinguished from the connecting portion 4D serving a function of connecting with the suspension device 10.

For example, when the vehicle turns, stress mainly due to twisting is generated in the torsion portion 2, stress mainly due to bending is generated in the arm 4, and stress due to bending and twisting is generated in the shoulder bent portion 3. When rigidity of the stabilizer 1 is increased, these stresses also increase, and thus durability of the stabilizer 1 easily decreases. As described above, it is possible to withstand high stress of the main body 21 by increasing hardness of the stabilizer 1, however, when hardness of the connecting portion 4D is increased, there is a possibility that toughness of the connecting portion 4D is reduced to cause delayed fracture.

In particular, the connecting seat 4E is brought into close contact with the connecting portion 5A of the link arm 7 by being fastened with the bolt 8 and the nut 9. However, for example, when dimensional accuracy such as flatness, parallelism or the like of the connecting seat 4E is lowered due to manufacturing error or the like (for example, with a flat surface of the connecting seat 4E being twisted), and when the connecting seat 4E is fastened by the bolt 8 and the nut 9, the connecting seat 4E is in a deformed state and brought into close contact with the connecting portion 5A of the link arm 7. Thus, stress is always applied to the connecting seat 4E, and there is a possibility that delayed fracture occurs.

To solve this problem, the present invention is a stabilizer wherein hardness of the connecting portion 4D is lower than that of the main body 21. With this stabilizer, it is possible to secure durability to withstand high stress by increasing hardness of the main body 21, so that fatigue life of the main body 21 can be improved, and it is possible to prevent reduction of toughness by reducing the hardness of the connecting portion 4D, so that delayed fracture of the connecting portion 4D can be suppressed.

Of course, in magnitude relation of the hardness, it is substantially difficult to clearly divide a region of the connecting portion 4D and a region of the main body 21 at a certain boundary surface. In the present invention, "hardness of the connecting portion 4D is lower than that of the main body 21" means that an average value of hardness of the connecting portion 4D which is a forged portion is lower than that of the main body 21.

The hardness of the connecting portion 4D is preferably equal to Brinell hardness HBW415 or less as hardness with no delayed fracture occurring in a conventional stabilizer. A lower limit of the hardness of the connecting portion 4D is about HBW300. On the other hand, it is possible to improve the fatigue life of the main body 21 by increasing the hardness to Brinell hardness HBW415 or more.

Hereinafter, embodiments of a manufacturing method in which the hardness of the connecting portion 4D is lower than that of the main body 21 will be described.

First Embodiment

Figure 5:
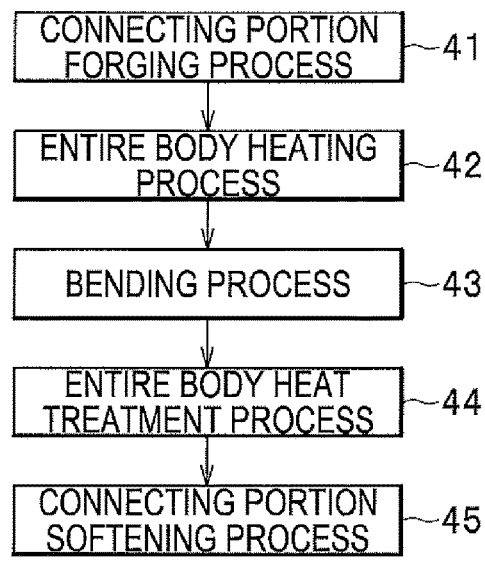
FIG. 5 is a process flow diagram of a first embodiment of a manufacturing method according to the present invention.

A first embodiment will be described with reference to FIG. 5. The first embodiment is a manufacturing method in which the hardness of the connecting portion 4D is lower than that of the main body 21, by performing an entire body heat treatment process 44 of heat treating an entire stabilizer 1 to increase the hardness of the entire stabilizer 1, and a connecting portion softening process 45 of heating the connecting portion 4D to reduce the hardness of the connecting portion 4D.

First, the connecting portion 4D is formed by forging in a connecting portion forging process 41. Next, the entire stabilizer 1 is heated in an entire body heating process 42, and then the connecting portion 4D and the main body 21 are bent into a shape shown in FIG. 2 in a bending process 43. Then, the entire stabilizer 1 is quenched and tempered as heat treatment to increase the hardness of the entire stabilizer 1 in the entire body heat treatment process 44. Then, only the connecting portion 4D is heated so that the hardness of the connecting portion 4D is lower than that of the main body 21 in the connecting portion softening process 45. As a result, the main body 21 has a high hardness sufficient to withstand high stress by the entire body heat treatment process 44, and the connecting portion 4D has a low hardness by the connecting portion softening process 45. The entire body heating process 42 may be performed after the bending process 43.

When the stabilizer 1 is manufactured using a material originally having a high hardness, the entire body heat treatment process 44 may be omitted.

Figure 4A:
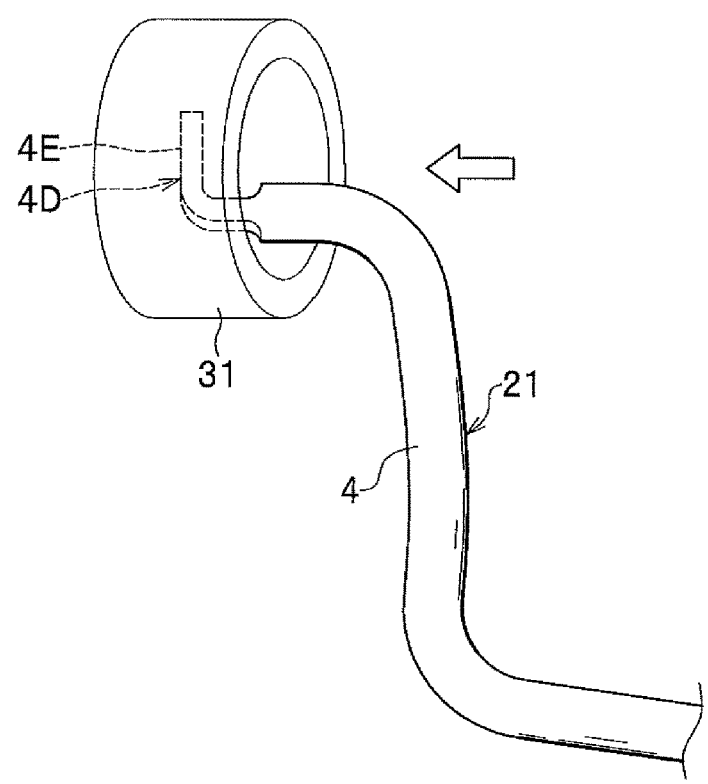
FIG. 4A is an explanatory view when the connecting portion is heated by high-frequency heating.
Figure 4B:
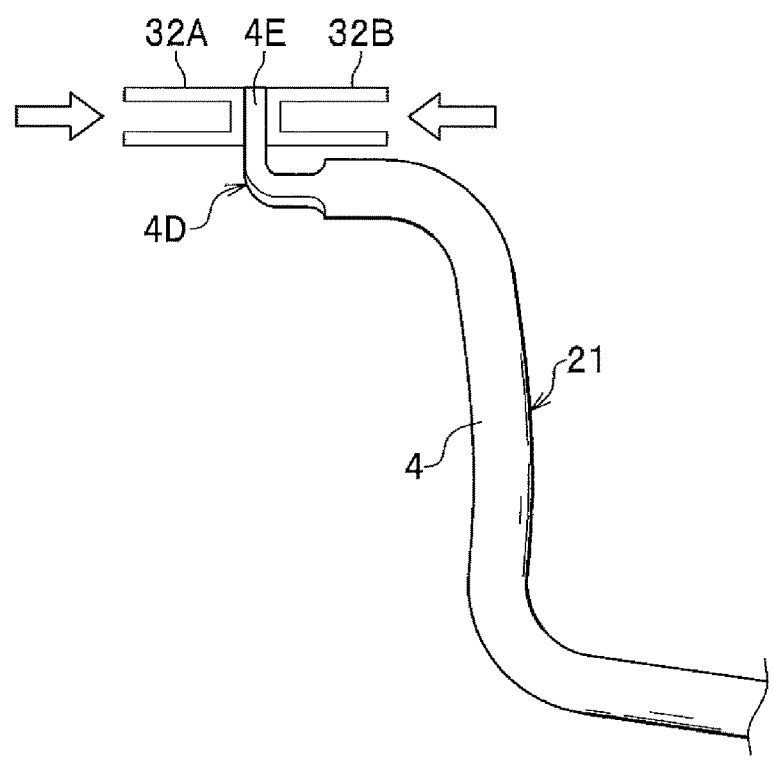
FIG. 4B is an explanatory view when the connecting portion is heated by electric heating.

Specific examples of the connecting portion softening process 45 include a high-frequency heating method and an electric heating method. FIG. 4A shows an example in which the connecting portion 4D is inserted into a high-frequency heating equipment 31 and heated, and FIG. 4B shows an example in which a pair of electrodes 32A, 32B is applied to both surfaces of the connecting seat 4E to electrically heat the connecting portion 4D. Since a heating equipment of high-frequency heating type or electric heating type is simple in structure and excellent in general versatility, equipment cost can be suppressed.

Second Embodiment

Figure 6A:
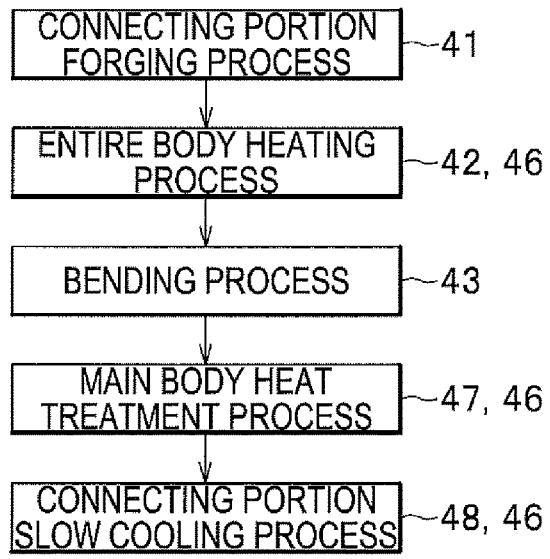
FIG. 6A is a process flow diagram of a second embodiment of the manufacturing method according to the present invention.

A second embodiment will be described with reference to FIG. 6A. The second embodiment is an example in which the hardness of the connecting portion 4D is reduced lower than that of the main body 21 by a main body hardening process 46 including a main body heat treatment process 47 of heat treating only the main body 21. The main body hardening process 46 of the second embodiment includes the entire body heating process 42, the main body heat treatment process 47 and a connecting portion slow cooling process 48.

First, the connecting portion 41D is formed by forging in the connecting portion forging process 41. Next, the entire stabilizer 1 is heated in the entire body heating process 42, and then the connecting portion 4D and the main body 21 are bent into the shape shown in FIG. 2 in bending process 43. Then, in the main body heat treatment process 47, only the main body 21 is quenched and tempered as heat treatment, so that the hardness of the main body 21 is increased. In the connecting portion slow cooling process 48, the hardness of the connecting portion 4D is reduced by cooling more slowly than the main body 21. That is, when the main body 21 is heat treated, heat is also conducted to the connecting portion 4D, and thus the connecting portion 4D is naturally air-cooled as slow cooling. As a result, the main body 21 has a high hardness sufficient to withstand high stress by the main body heat treatment process 47, and the connecting portion 4D has a low hardness by the connecting portion slow cooling process 48. The entire body heating process 42 may be performed after the bending process 43.

Third Embodiment

Figure 6B:
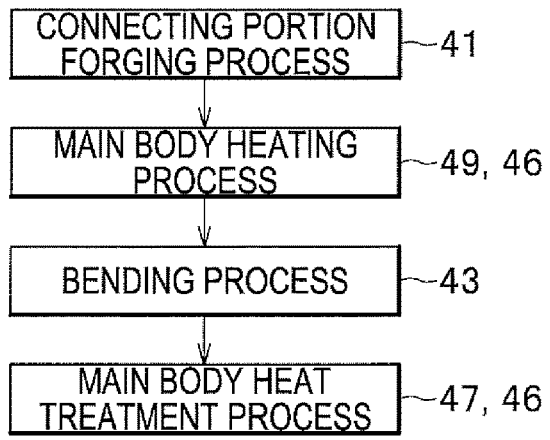
FIG. 6B is a process flow diagram of a third embodiment of the manufacturing method according to the present invention.

A third embodiment will be described with reference to FIG. 6B. The third embodiment is also an example in which the hardness of the connecting portion 4D is reduced lower than that of the main body 21 by the main body hardening process 46 including the main body heat treatment process 47 of heat treating only the main body 21. The main body hardening process 46 of the third embodiment includes a main body heating process 49 of heating only the main body 21 and the main body heat treatment process 47.

First, the connecting portion 4D is formed by forging in the connecting portion forging process 41. Next, only the main body 21 is heated in the main body heating process 49, and then the connecting portion 4D and the main body 21 are bent into the shape shown in FIG. 2 in the bending process 43. Then, in the main body heat treatment process 47, only the main body 21 is quenched and tempered as heat treatment, so that the hardness of the main body 21 is increased. As a result, the hardness of the connecting portion 4D is reduced lower than that of the main body 21. The main body heating process 49 may be performed after the bending process 43.

Specific examples of the main portion heating process 49 include a method of high-frequency heating the main body 21 and a method of electrically heating the main body 21. In the high-frequency heating method, for example, an induction heating coil passes through only the main body 21. In the electric heating method, electrodes are applied to a predetermined portion spaced from the connecting portion 4D of the main body 21 and energized. By using the high-frequency heating method or the electric heating method, it is possible to reduce the hardness of the connecting portion 4D lower than that of the main body 21 without reducing manufacturing efficiency of the stabilizer 1 so much.

REFERENCE SIGNS LIST

1: stabilizer
2: torsion portion
3: shoulder bent portion
4: arm
4D: connecting portion
21: main body

The invention claimed is:

1. A method for manufacturing a stabilizer comprising:
providing an elastic main body of the stabilizer including a torsion portion, shoulder bent portions bent respectively from both ends of the torsion portion, and arm portions extending respectively from the shoulder bent portions; and
connecting portions on both ends of the elastic main body and respectively connected to left and right suspension devices, the elastic main body and the connecting portions constituting an entire stabilizer;
an entire body heat treatment process of heating and quenching the entire stabilizer of the torsion portion, the shoulder bent portions, the arm portions, and the connecting portions to increase hardness of the entire stabilizer; and
a connecting portion softening process, after the entire body heat treatment process, of reducing hardness of at least one connecting portion by heating the at least one connecting portion while the elastic main body is kept from being heated, thereby manufacturing the stabilizer comprising the at least one connecting portion lower in hardness than the torsion portion, the shoulder bent portions, and the arm portions of the elastic main body.

2. The method for manufacturing the stabilizer according to claim 1, wherein the connecting portion softening process includes applying high-frequency heat or electrically heating the at least one connecting portion.

* * * * *